United States Patent
Lin (10) Patent No.: US 12,099,362 B2
(45) Date of Patent: Sep. 24, 2024

(54) METHOD FOR AUTOMATIC AVOIDANCE OF OBSTACLES BY MOBILE APPARATUS AND AUTONOMOUS MOBILE APPARATUS APPLYING METHOD

(71) Applicant: HON HAI PRECISION INDUSTRY CO., LTD., New Taipei (TW)

(72) Inventor: Jung-Yi Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 147 days.

(21) Appl. No.: 17/533,376

(22) Filed: Nov. 23, 2021

(65) Prior Publication Data

US 2022/0179425 A1 Jun. 9, 2022

(30) Foreign Application Priority Data

Dec. 9, 2020 (CN) .......................... 202011449390.2

(51) Int. Cl.
*G05D 1/00* (2024.01)
(52) U.S. Cl.
CPC ......... *G05D 1/0214* (2013.01); *G05D 1/0223* (2013.01); *G05D 1/0238* (2013.01); *G05D 1/0246* (2013.01)
(58) Field of Classification Search
None
See application file for complete search history.

(56) References Cited

U.S. PATENT DOCUMENTS

| 2013/0116880 A1* | 5/2013 | Shitamoto | G05D 1/024 701/25 |
| 2019/0256088 A1* | 8/2019 | Sharma | B60W 30/0953 |
| 2019/0361452 A1* | 11/2019 | Tahir | G01S 13/56 |

FOREIGN PATENT DOCUMENTS

| CN | 108399792 A | | 8/2018 |
| CN | 111552284 A | | 8/2020 |
| JP | 2011008313 A | * | 1/2011 |

* cited by examiner

*Primary Examiner* — Tuan C To
*Assistant Examiner* — David Ruben Pedersen
(74) *Attorney, Agent, or Firm* — ScienBiziP, P.C.

(57) ABSTRACT

A method for avoiding a collision between an autonomous mobile apparatus and a stationary or moving object initially deemed to be a collision threat includes acquiring a passage clearance of the object, from the point of view of the autonomous mobile apparatus, by establishing in two dimensions the nearest and the furthest physical parts of the object in the planned path of the autonomous mobile apparatus. Dimensions between the current position of the autonomous mobile apparatus and the at least two boundaries are computed as relative distances, and are considered as avoidance distances when the relative distances are greater than the passage clearance. For only one avoidance distance, a target boundary for clearance with safety is set based on the avoidance distance. The autonomous mobile apparatus moves along a specified direction to aim at the target boundary. An autonomous mobile apparatus applying the method is also disclosed.

14 Claims, 8 Drawing Sheets

METHOD FOR AUTOMATIC AVOIDANCE OF OBSTACLES BY MOBILE APPARATUS AND AUTONOMOUS MOBILE APPARATUS APPLYING METHOD

FIELD

The subject matter herein generally relates to traffic safety.

BACKGROUND

Autonomous apparatuses are widely used, many of them utilizing artificial intelligence (AI). These may be automated guided vehicles (AGVs), automated mobile robots (AMRs) in a factory, and in a hospital. The autonomous mobile apparatuses move along a planned path. When another object or vehicle with a higher priority, such as an ambulance, moves into the planned path, the autonomous mobile apparatus may fail to avoid the other object, and a collision may take place.

Thus, there is room for improvement in the art.

BRIEF DESCRIPTION OF THE FIGURES

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

The present disclosure provides an autonomous mobile apparatus for autonomous avoidance of obstacles.

Figure 1:
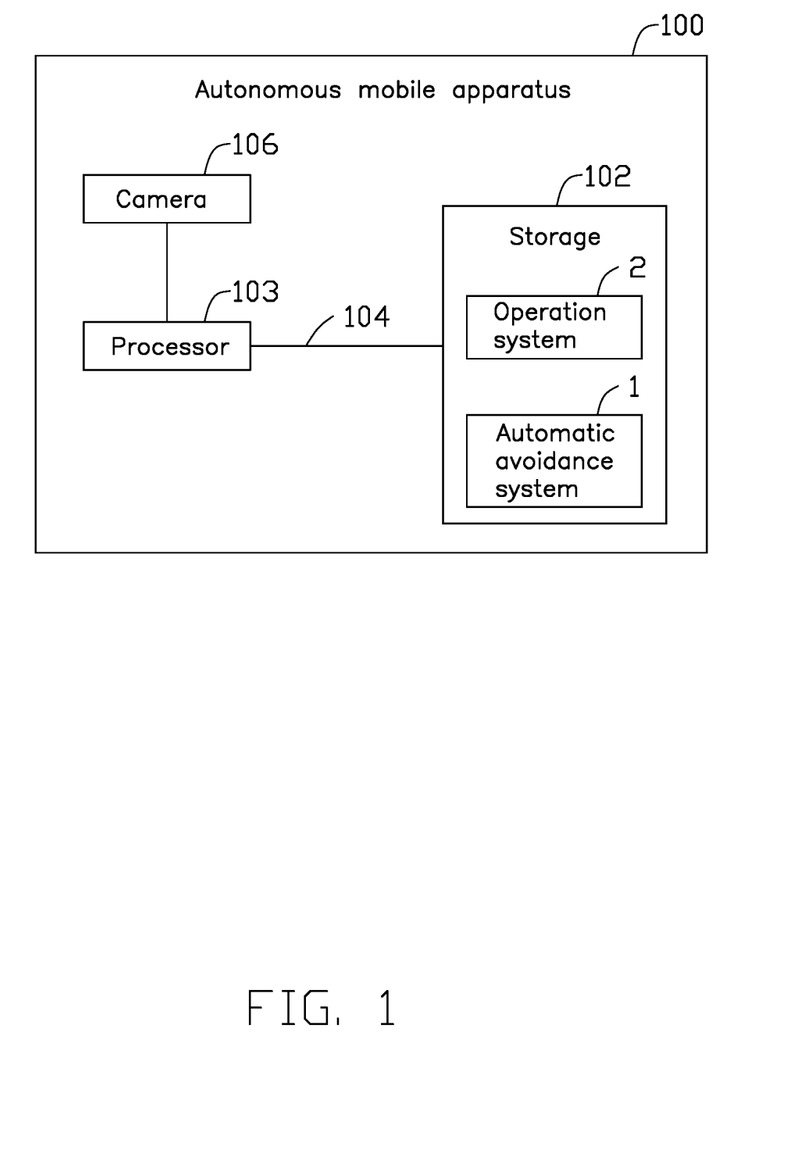
FIG. 1 is a diagram illustrating an embodiment of an autonomous mobile apparatus; the autonomous mobile apparatus comprising an automatic avoidance system.
Figure 3:
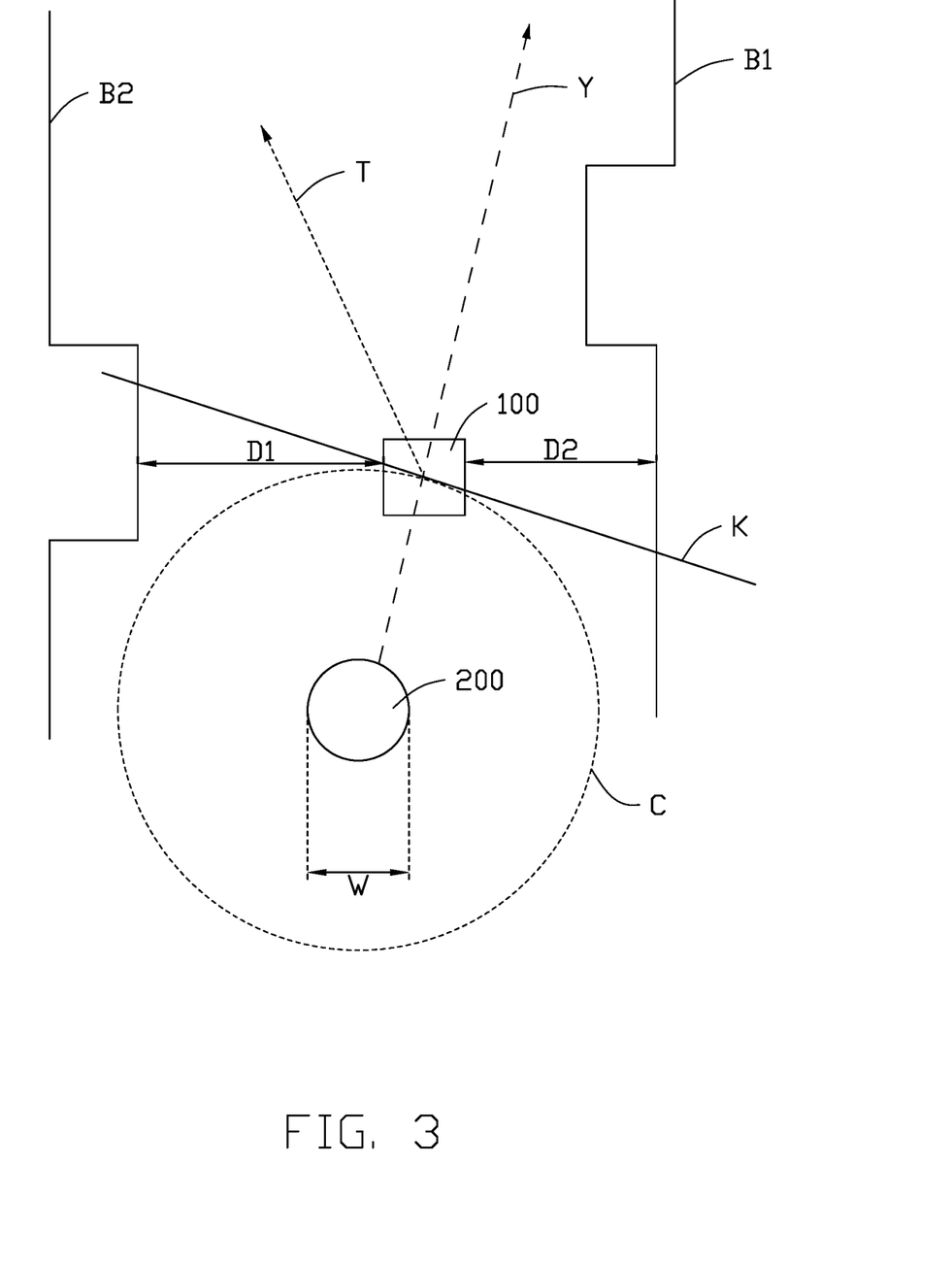
FIG. 3 is a diagram illustrating a first embodiment of an environment of the autonomous mobile apparatus of FIG. 1.

FIG. 1 shows an autonomous mobile apparatus 100. The autonomous mobile apparatus 100 includes a storage 102, a processor 103, a data bus 104, and at least one camera 106. The autonomous mobile apparatus 100 can communicate with object apparatus 200 (as shown in FIG. 3). In one embodiment, the autonomous mobile apparatus 100 can be an automated robot in a factory for carrying goods, or carrying patients in a hospital, delivering to tables in a restaurant, an intelligent vehicle in a lane on a road, not being limited hereto. The object apparatus 200 also can be an autonomous mobile apparatus 100.

The autonomous mobile apparatus 100 acquires a passage clearance of the object apparatus 200 and identifies at least two opposite boundaries in current position of the autonomous mobile apparatus 100, when an avoidance instruction is received. In one embodiment, the passage clearance is computed by reference to an image captured by the at least one camera 106. The autonomous mobile apparatus 100 further computes horizontal dimensions between the current position and the at least two boundaries as related distances, and also determines whether there is at least one related distance larger than the passage clearance as a safe clearance distance. The autonomous mobile apparatus 100 confirms a target boundary based on the safe clearance distance, and plans a moving path along a specified direction for executing an avoidance operation.

The storage 102 stores program codes. The storage 102 can be an embedded circuit having a storing function, such as a memory card, a trans-flash (TF) card, a smart media card, a secure digital card, and a flash card, and so on. The storage 102 transmits data with the processor 103 through the data bus 104. The storage 102 stores an operation system 2 and an automatic avoidance system 1.

The operation system 2 manages and controls hardware and software programs. The operation system 2 further supports operations of the automatic avoidance system 1 and other software and programs.

Figure 2:
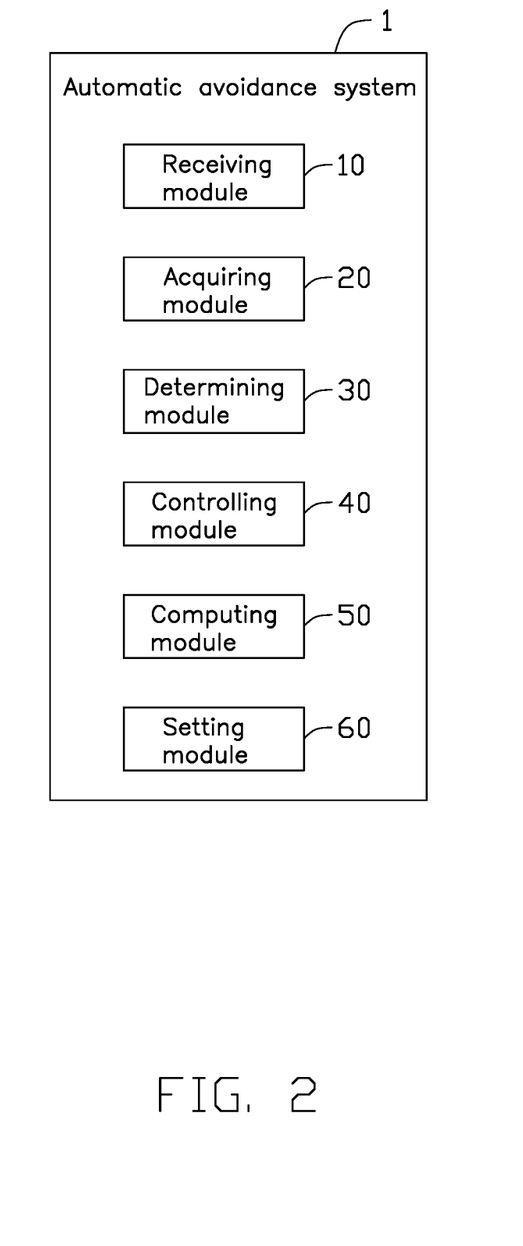
FIG. 2 is a diagram illustrating an embodiment of the automatic avoidance system of FIG. 1.

The processor 103 can be a micro-processor or a digital processor. The processor 103 is used for running the program codes stored in the storage 102 to execute different functions. Modules in FIG. 2 are program codes stored in the storage 102 and are implemented by the processor 103 for executing a method for automatic collision-avoidance. The processor 103 can be a central processing unit (CPU), or a large scale integrated circuit, being an operating core and a control core.

The data bus 104 exchanges data with the storage 102 and the processor 103.

The at least one camera 106 can capture images or record video. In at least one embodiment, the camera 106 can be set inside or beside the autonomous mobile apparatus 100. The at least one camera 106 can be rotated based on the control of the processor 103.

FIG. 2 shows the automatic avoidance system 1. The automatic avoidance system 1 includes a plurality of modules.

A receiving module 10 receives the avoidance instruction.

In one embodiment, the autonomous mobile apparatus 100 further broadcasts the avoidance instruction to other autonomous mobile apparatuses 100 in a specified range. The specified range can be a working range of the autonomous mobile apparatus 100, and also can be a passage range of the object apparatus 200. In other embodiments, the avoidance instruction can be generated from a central processing unit or a server.

An acquiring module 20 acquires the passage clearance W of the object apparatus 200, and acquires at least two opposite boundaries B1 and B2 from current position of the autonomous mobile apparatus 100. The passage clearance W can be a width of the object apparatus 200, and also can be larger than the width of the object apparatus 200.

In one embodiment, the acquiring module 20 can acquire the passage clearance W by the at least one camera 106 in an image processing manner.

A determining module 30 determines whether a specified condition applies to the autonomous mobile apparatus 100.

In one embodiment, when the specified condition applies to autonomous mobile apparatus 100, the autonomous mobile apparatus 100 on its original or planned path is deemed unlikely to collide with the object apparatus 200 to pass, and the avoidance operation is unnecessary. When the specified condition does not apply to the autonomous mobile apparatus 100, the autonomous mobile apparatus 100 is determined to need to execute the avoidance operation for avoiding a crash between the autonomous mobile apparatus 100 and the object apparatus 200.

In one embodiment, the acquiring module 20 further acquires a first travel direction of the autonomous mobile apparatus 100 and a second travel direction Y of the object apparatus 200. The determining module 30 further determines whether the first travel direction and the second travel direction Y are overlapped with each other. When the first travel direction and the second travel direction Y are overlapped with each other, the acquiring module 20 acquires a speed of the autonomous mobile apparatus 100 as a first speed, and acquires a speed of the object apparatus 200 as a second speed. The determining module 30 further determines whether the second speed is greater than the first speed. When the second speed is less than or equal to the first speed, the determining module 30 will determine that the specified condition does apply to the autonomous mobile apparatus 100. When the first travel direction is different from the second travel direction Y or when the second speed is greater than the first speed, the determining module 30 determines that the specified condition does not apply to the autonomous mobile apparatus 100.

Figure 4:
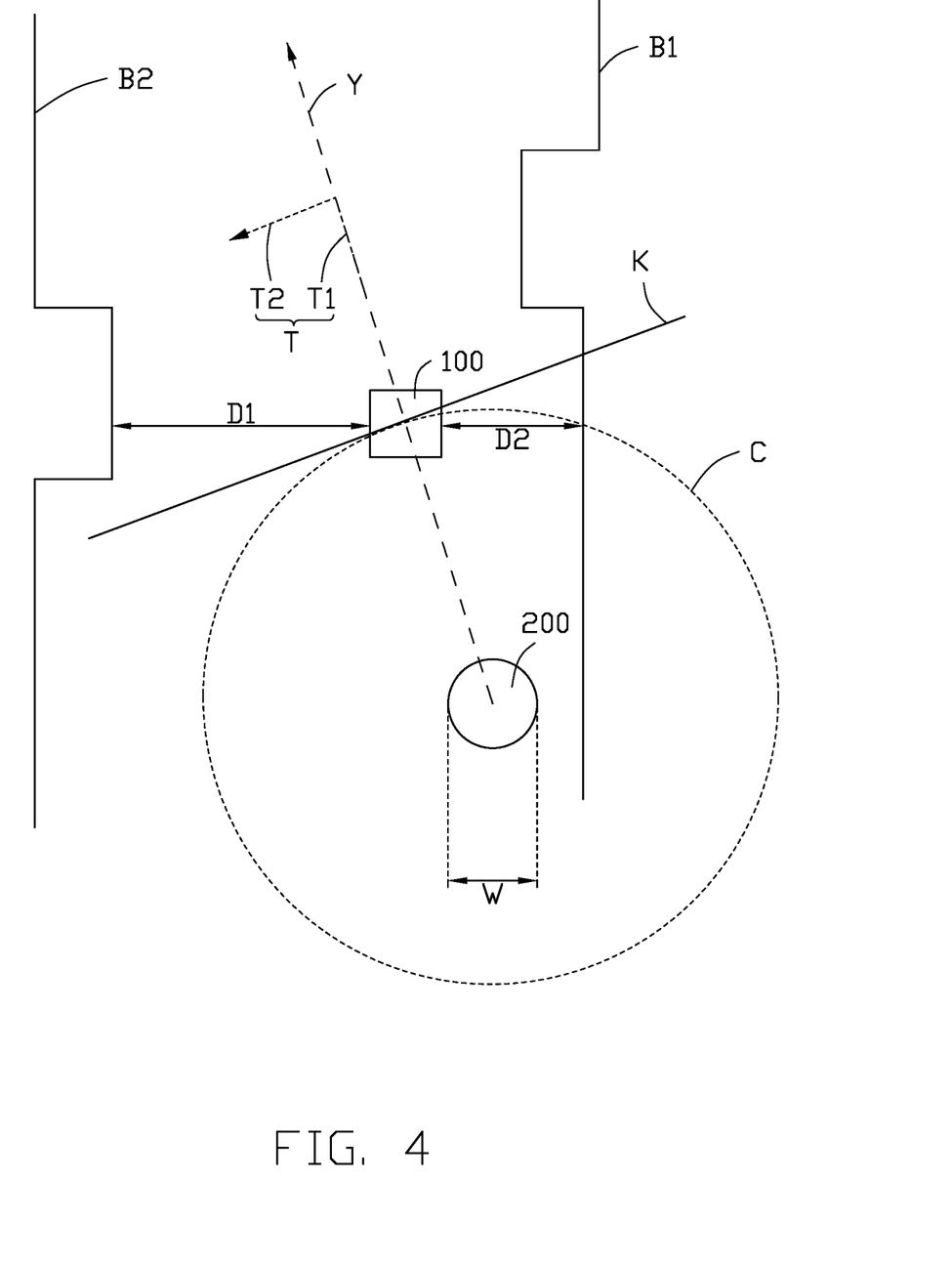
FIG. 4 is a diagram illustrating a second embodiment of an environment of the autonomous mobile apparatus of FIG. 1.

In one embodiment, the autonomous mobile apparatus 100 includes a planned path T. The planned path T can be a segment (as shown in FIG. 3). The planned path T can include a first planned path T1 and a second planned path T2 (as shown in FIG. 4). The first travel direction is a moving direction of the autonomous mobile apparatus 100 in a specified time period. For example, in the specified time period, the autonomous mobile apparatus 100 moves along the first planned path T1, and a moving direction along the first planned path T1 is considered as the first travel direction. When the autonomous mobile apparatus 100 moves along the second planned path T2 in the specified time period, and a moving direction along the second planned path T2 is considered as the first travel direction, and the first travel direction is intersected with the second travel direction Y of the object apparatus 200.

A controlling module 40 controls the activation and deactivation of the avoidance operation of the autonomous mobile apparatus 100, and controls the autonomous mobile apparatus 100 to move along the first travel direction when the specified condition applies to the autonomous mobile apparatus 100.

A computing module 50 computes distances between the current position of the autonomous mobile apparatus 100 and the at least two boundaries B1 and B2 as relative respective distances D1 and D2.

The determining module 30 further determines that whether there is at least one avoidance distance. In one embodiment, the at least one avoidance distance exists when at least one of the relative respective distances D1 and D2 is larger than the passage clearance W.

The setting module 60 sets the target boundary based on the at least one avoidance distance. In one embodiment, the target boundary is the boundary B1 or B2 corresponding to the at least one avoidance distance.

In one embodiment, the determining module 30 further determines whether there is only one avoidance distance. When there are more than one avoidance distances, the setting module 60 further sets a reference line K, acquires an angle between the reference line K and the avoidance distance, and selects the boundary B1 or B2 corresponding to the avoidance distance with a positive angle as the target boundary. When there is only one avoidance distance, the setting module 60 sets the boundary B1 or B2 corresponding to the avoidance distance.

In one embodiment, the reference line K is a line particular to a connection line between the autonomous mobile apparatus 100 and the object apparatus 200. For example, a reference circle is formed with the object apparatus 200 as its center, and diameter of reference circle is the distance between the autonomous mobile apparatus 100 and the object apparatus 200. The reference line K is a tangent to the reference circle at a point of the position of the autonomous mobile apparatus 100.

In one embodiment, the specified direction is along the reference line K, and is pointed to the target boundary. For example, when the target boundary is the boundary B1, the specified direction is along the reference line K, and is pointing to the boundary B1. When the target boundary is the boundary B2, the specified direction is along the reference line K, and is pointing to the boundary B2.

In one embodiment, the angle between the reference line K and the avoidance distance can be a positive angle or a negative angle. The reference line K and the connection line between the autonomous mobile apparatus 100 and the object apparatus 200 serve as axis of coordinates to establish a quadrant. The angle in a first or second quadrant is a positive angle, and the angle in a third or fourth quadrant is a negative angle.

In another embodiment, when more than one avoidance distances exist, the setting module 60 selects the boundary B1 or B2 corresponding to a minimum avoidance distance as the target boundary. When there is only one avoidance distance, the setting module 60 sets the boundary B1 or B2 corresponding to the avoidance distance as the target boundary.

The controlling module 40 further controls the autonomous mobile apparatus 100 to execute the avoidance operation for moving along the specified direction and staying at the target boundary.

The controlling module 40 deactivates the avoidance operation according to a deactivation instruction when the autonomous mobile apparatus 100 has avoided a collision, and controls the autonomous mobile apparatus 100 to again move along the planned path T.

In one embodiment, the deactivation instruction can be sent from the object apparatus 200, and also can be sent from the controlling module 40 after the object apparatus 200 has passed the autonomous mobile apparatus 100.

Referring to FIG. 3, FIG. 3 illustrates a first environment of the autonomous mobile apparatus 100.

The receiving module 10 receives the avoidance instruction from the object apparatus 200. The acquiring module 20 acquires the passage clearance W of the object apparatus 200 and the boundaries B1 and B2. While the autonomous mobile apparatus 100 plans to move along the planned path T, the first travel direction of the planned path T is not overlapped with the second travel direction Y of the object apparatus 200, the determining module 30 determines that the autonomous mobile apparatus 100 is not satisfied with the specified condition. The computing module 50 computes the relative distance D1 between the autonomous mobile apparatus 100 and the boundary B1, and the relative distance D2 between the autonomous mobile apparatus 100 and the boundary B2. When both distances D1/D2 are greater than the passage clearance W, the determining module 30 determines that there is at least one avoidance distance. The setting module 60 sets the reference line K. The angle between the reference line K and the relative distance D1 is the positive angle, and the angle between the reference line K and the relative distance D2 is a negative angle. The setting module 60 further selects the boundary B1 corresponding to the relative distance D1 as the target boundary. The control module 40 controls the autonomous mobile apparatus 100 to execute the avoidance operation by moving along the reference line K, and stays at the target boundary, which is the boundary B1.

FIG. 4 illustrates a second environment of the autonomous mobile apparatus 100.

The receiving module 10 receives the avoidance instruction from the object apparatus 200. The acquiring module 20 acquires the passage clearance W of the object apparatus 200 and the boundaries B1/B2. While the autonomous mobile apparatus 100 plans to move along the planned path T, the first travel direction of the planned path T is overlapped with the second travel direction Y of the object apparatus 200, and the first speed of the autonomous mobile apparatus 100 is greater than the second speed of the target apparatus 200, the determining module determines that the specified condition applies to autonomous mobile apparatus 100. The controlling module 40 controls the autonomous mobile apparatus 100 to continue moving along the first travel direction Y.

By acquiring passage clearance W of the object apparatus 200 and relative distances D1/D2 to the boundaries B1/B2, the avoidance operation is executed along the specified direction for avoiding a collision between the autonomous mobile apparatus 100 and the object apparatus 200. Safety of the autonomous mobile apparatus 100 is improved, and the control of the autonomous mobile apparatus 100 is optimized.

Figure 5:
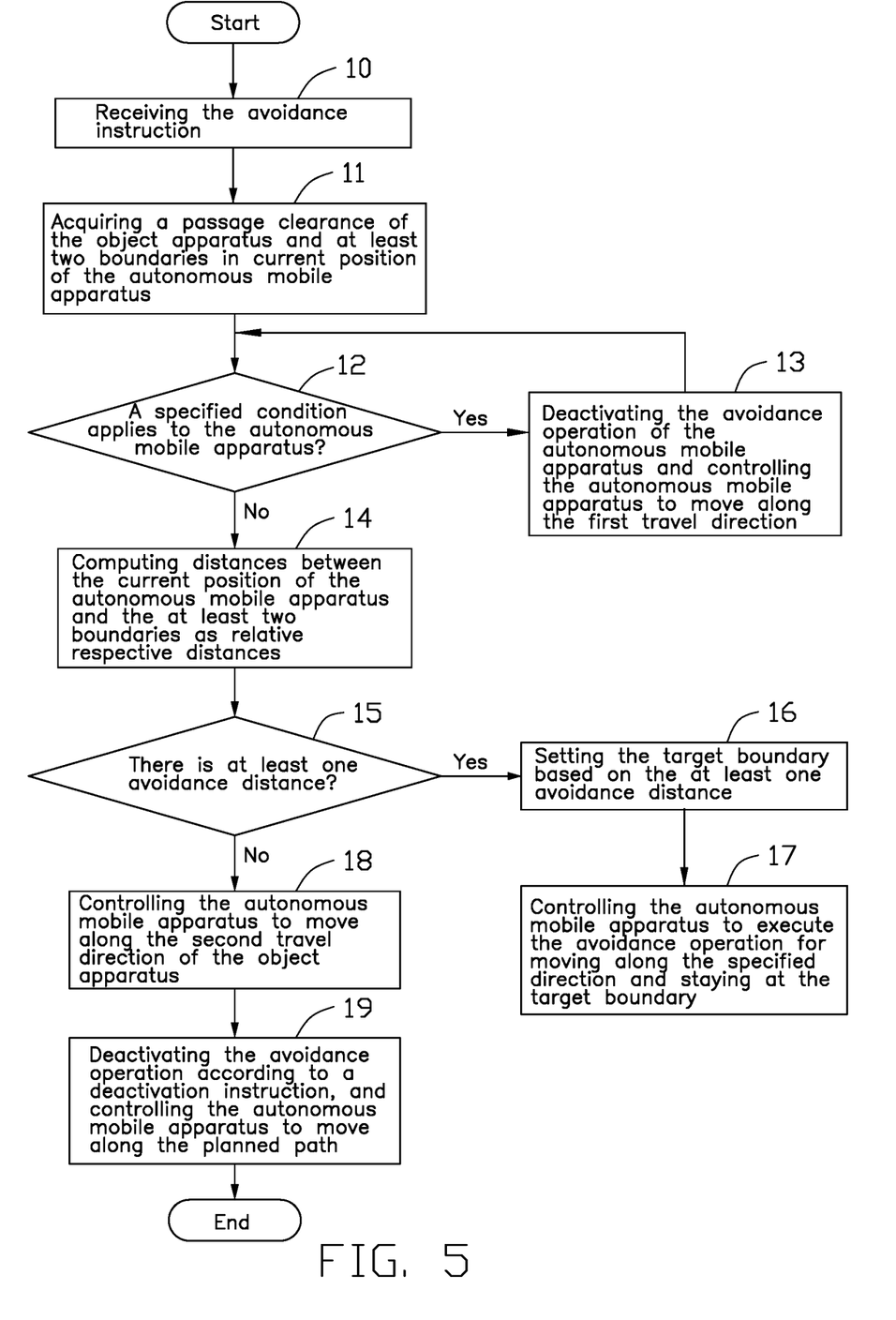
FIG. 5 is a flowchart illustrating an embodiment of automatic method for collision-avoidance.

FIG. 5 shows a flowchart of a method for automatic avoidance of an object such as the object apparatus 200. In at least one embodiment, the method is used in the automatic avoidance system 1 of the autonomous mobile apparatus 100. The autonomous mobile apparatus 100 can include a part or all or have more than the hardware and software in FIGS. 1 and 2, or can have the elements in different locations. The autonomous mobile apparatus 100 can communicate with the server through a wireless communication network. The wireless communication network can be a mobile communication network or a satellite network. In at least one embodiment, the server can be a single server, and can be a server group with servers having different functions. The autonomous mobile apparatus 100 can provide a visible interface. The visible interface provides an interface for user to communicate with the autonomous mobile apparatus 100. The user can use mobile phone or computer to connect with the autonomous apparatus 100.

The autonomous mobile apparatus 100 processes the program codes in the storage 102 by the processor 103 to execute the receiving module 10, the acquiring module 20, the determining module 30, the controlling module 40, the computing module 50, and the setting module 60, and communicates with the at least one cameral 106 to implement the method for collision-avoidance.

The method may comprise at least the following steps, which also may be re-ordered:

In block 10, the receiving module 10 receives the avoidance instruction.

In one embodiment, the autonomous mobile apparatus 100 further broadcast the avoidance instruction to other autonomous mobile apparatus 100 in a specified range. The specified range can be a working range of the autonomous mobile apparatus 100, and also can be a passage range of the object apparatus 200. In one embodiment, the avoidance instruction is sent from the object apparatus 200. In other embodiments, the avoidance instruction is sent from a central processor unit or a sever.

In block 11, the acquiring module 20 acquires the passage clearance W of the object apparatus 200, and acquires at least two opposite boundaries B1/B2 in current position of the autonomous mobile apparatus 100.

In one embodiment, the acquiring module 20 can acquire the passage width W by the at least one camera 106 in an image processing manner. The passage clearance W can be a width of the object apparatus 200, and also can be larger than the width of the object apparatus 200.

In block 12, the determining module 30 determines a specified condition applies to the autonomous mobile apparatus 100.

In one embodiment, when the specified condition applies to the autonomous mobile apparatus 100, the autonomous mobile apparatus 100 on its original or planned path is deemed unlikely to collide with the object apparatus 200 to pass, and the avoidance operation is unnecessary. When the specified condition does not apply to the autonomous mobile apparatus 100, the autonomous mobile apparatus 100 is determined to need to execute the avoidance operation for avoiding a crash between the autonomous mobile apparatus 100 and the object apparatus 200.

Figure 6:
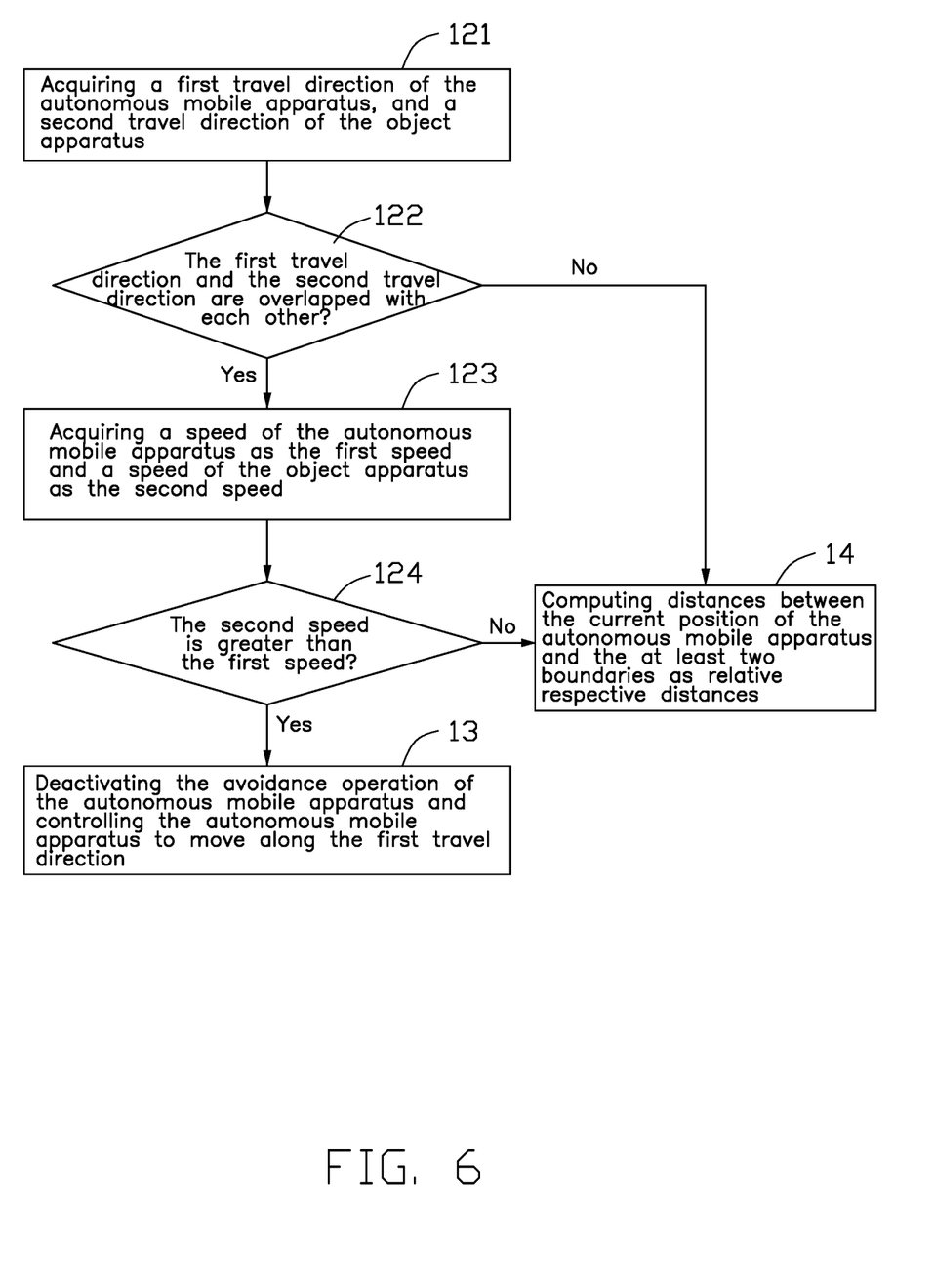
FIG. 6 is a detailed flowchart illustrating an embodiment of block 12 in the method of FIG. 5.

FIG. 6 illustrates a detail flowchart of the block 12. The block 12 further includes the following steps.

In block 121, the acquiring module 20 further acquires a first travel direction T of the autonomous mobile apparatus 100 and a second travel direction Y of the object apparatus 200.

In block 122, the determining module 20 determines that whether the first travel direction and the second travel direction Y are overlapped with each other.

In block 123, when the first travel direction and the second travel direction Y are overlapped with each other, the acquiring module 20 further acquires a speed of the autonomous mobile apparatus 100 as a first speed, and acquires a speed of the object apparatus 200 as a second speed.

In block 124, the determining module 30 further determines that whether the second speed is greater than the first speed.

When the second speed is less than or equal to the first speed, the determining module 30 determines that the autonomous mobile apparatus 100 is satisfied with the specified condition, and the procedure goes to block 13.

When the first travel direction is different from the second travel direction Y, or the second speed is greater than the first speed, the determining module 30 determines that the specified condition does not apply to the autonomous mobile apparatus 100, and the procedure goes to block 14.

In one embodiment, the autonomous mobile apparatus 100 includes a planned path T. The planned path T can be a segment (as shown in FIG. 3). The planned path T can include a first planed path T1 and a second planed path T2 (as shown in FIG. 4). The first travel direction is a moving direction of the autonomous mobile apparatus 100 in a specified time period. For example, in the specified time period, the autonomous mobile apparatus 100 moves along the first planned path T1, and a moving direction along the first planned path T1 is considered as the first travel direction. When the autonomous mobile apparatus 100 moves along the second planned path T2 in the specified time period, and a moving direction along the second planned path T2 is considered as the first travel direction, and the first travel direction is intersected with the second travel direction of the object apparatus 200.

In block 13, the controlling module 40 deactivates of the avoidance operation of the autonomous mobile apparatus 100, and controls the autonomous mobile apparatus 100 to move along the first travel direction when the specified condition applies to the autonomous mobile apparatus 100.

In block 14, the computing module 50 computes distances between the current position of the autonomous mobile apparatus 100 and the at least two boundaries B1 and B2 as relative respective distances D1 and D2.

In block 15, the determining module 30 further determines that whether there is at least one avoidance distance.

In one embodiment, the at least one avoidance distance exists when at least one of the relative respective distance D1 and D2.

In block 16, when there is at least one avoidance distance, the setting module 60 sets the target boundary based on the at least one avoidance distance.

Figure 7:
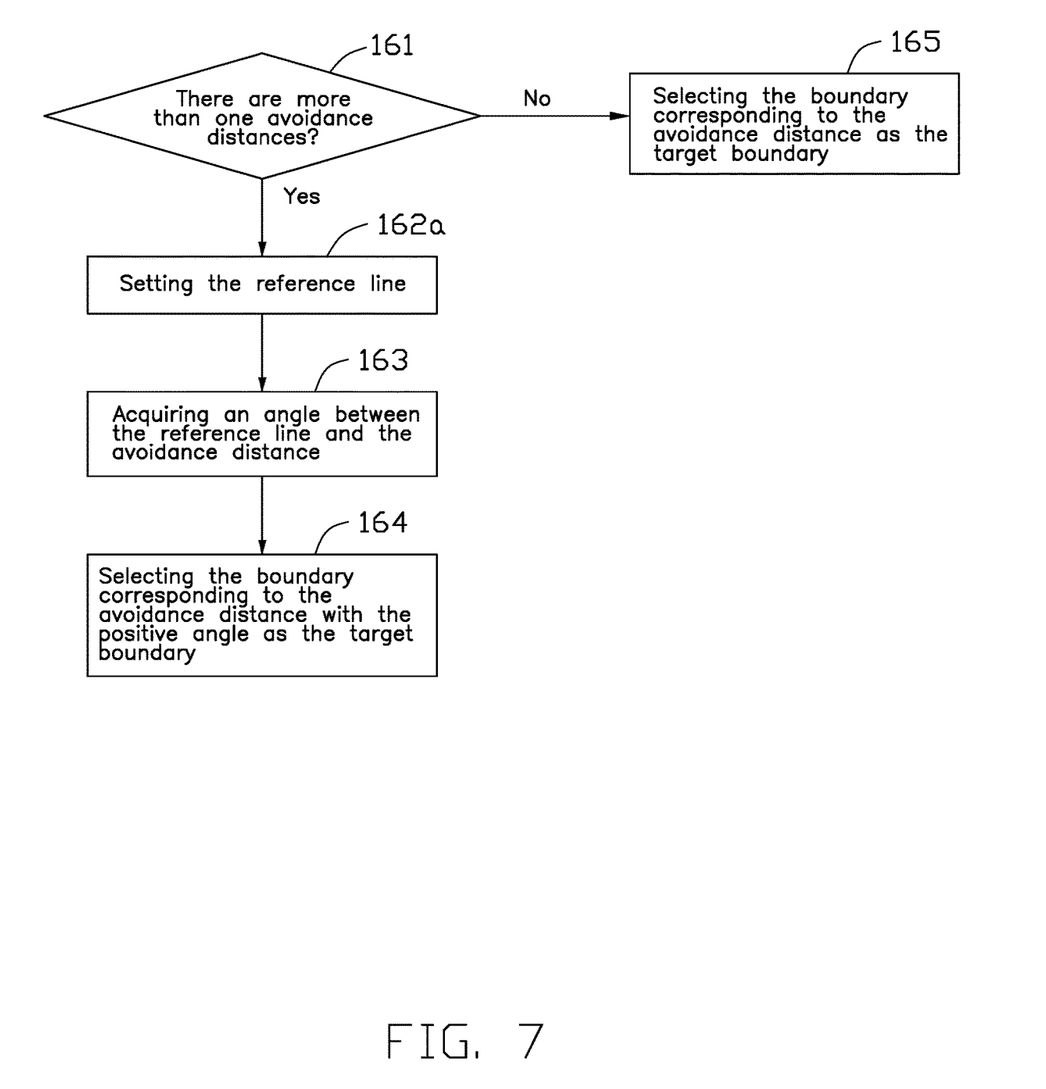
FIG. 7 is a detailed flowchart illustrating a first embodiment of block 16 in the method.

FIG. 7 shows a detailed flowchart of a first embodiment of the block 16.

In block 161, the determining module 30 further determines that whether there are more than one avoidance distances.

In block 162a, when there are more than one avoidance distance, the setting module 60 sets the reference line K.

In block 163, the setting module 60 acquires an angle between the reference line K and the at least one avoidance distance.

In block 164, the setting module 60 further selects the boundary corresponding to the avoidance distance with the positive angle as the target boundary.

In block 165, when there is only one avoidance distance, the setting module 60 sets the boundary B1/B2 corresponding to the avoidance distance as the target boundary.

In one embodiment, the reference line K is a line particular to a connection line between the autonomous mobile apparatus 100 and the object apparatus 200. For example, a reference circle is formed with the object apparatus 200 as its center, and diameter of the reference circle is the distance between the autonomous mobile apparatus 100 and the object apparatus 200. The reference line K is a tangent to the reference circle at a point of the position of the autonomous mobile apparatus 100.

In one embodiment, the angle between the reference line K and the avoidance distance can be a positive angle or a negative angle. The reference line K and the connection line between the autonomous mobile apparatus 100 and the object apparatus 200 are served as coordinate axis to establish a quadrant. The angle in a first or second quadrant is a positive angle, and the angle in a third or fourth quadrant is a negative angle.

Figure 8:
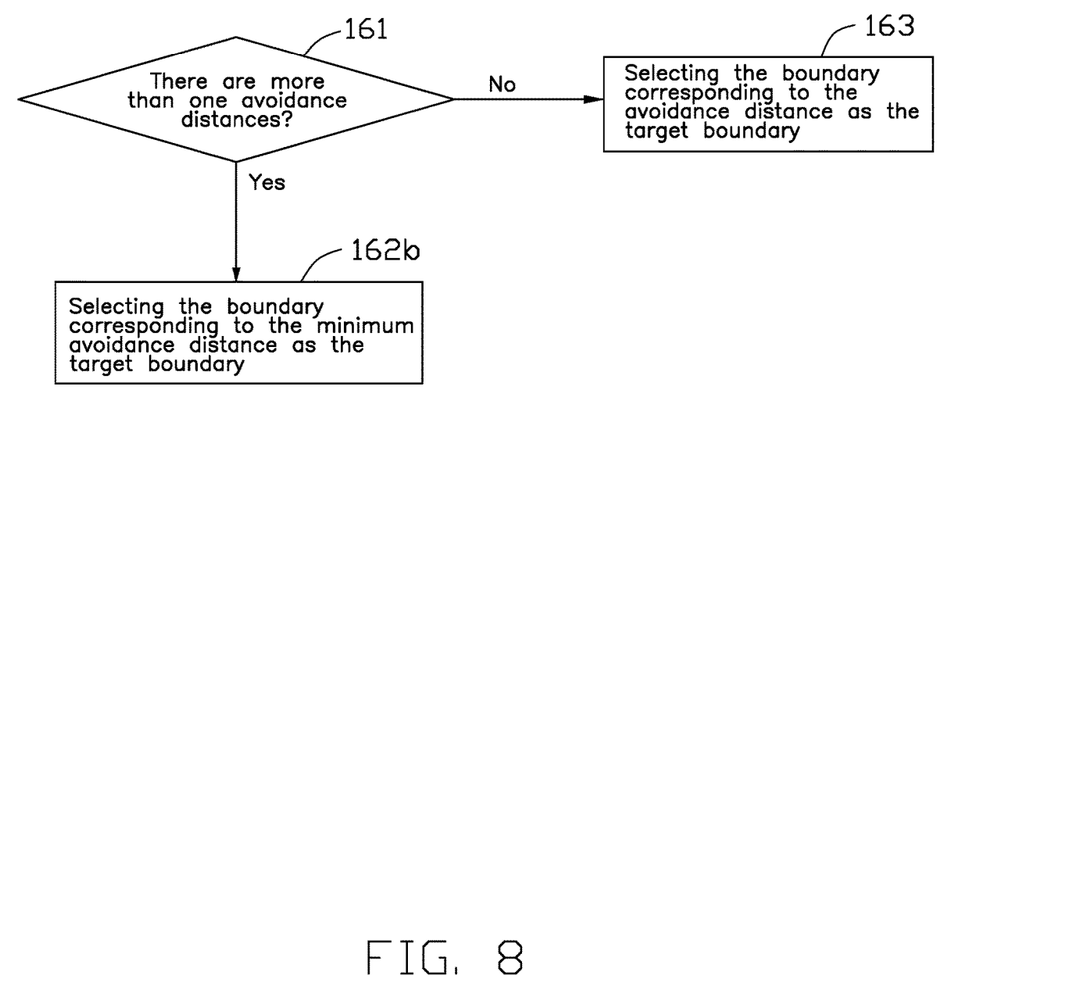
FIG. 8 is a detailed flowchart illustrating a second embodiment of block 16.

FIG. 8 shows a detailed flowchart of a second embodiment of the block 16.

In block 161, the determining module 30 determines that whether there are more than one avoidance distances.

In block 162b, when there are more than one avoidance distances, the setting module 60 selects the boundary B1 or B2 corresponding to the minimum avoidance distance as the target boundary.

In block 163, when there is only one avoidance distance, the setting module 60 selects the boundary B1 or B2 corresponding to the avoidance distance as the target boundary.

In block 17, the controlling module 40 controls the autonomous mobile apparatus 100 to execute the avoidance operation for moving along the specified direction and staying at the target boundary.

In one embodiment, the specified direction is along the reference line K, and is pointed to the target boundary. For example, when the target boundary is the boundary B1, the specified direction is along the reference line K, and is pointing to the boundary B1. When the target boundary is the boundary B2, the specified direction is along the reference line K, and is pointing to the boundary B2.

In block 18, when there is no avoidance distance, the controlling module controls the autonomous mobile apparatus 100 to move along the second travel direction of the object apparatus 200.

In block 19, when receiving the deactivation instruction, the controlling module 40 deactivates the avoidance operation, and controls the autonomous mobile apparatus 100 to move along the planned path T.

In one embodiment, the deactivation instruction can be sent from the object apparatus 200, and also can be sent after the object apparatus 200 has passed the autonomous mobile apparatus 100.

By acquiring passage clearance of the object apparatus 200 and relative distances D1 and D2 to the boundaries B1 and B2, the avoidance operation is executed along the specified direction for avoiding a collision between the autonomous mobile apparatus 100 and the object apparatus 200. Safety of the autonomous mobile apparatus 100 is improved, and the control of the autonomous mobile apparatus 100 is optimized.

While various and preferred embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A method in an autonomous mobile apparatus for autonomous avoidance of obstacles; the autonomous mobile apparatus comprises a processor and a storage with at least one command; the at least one command is implemented by the processor to execute the following steps:
receiving an avoidance instruction from an object apparatus;
acquiring a passage clearance of the object apparatus and at least two boundaries in current position of the autonomous mobile apparatus;
computing distances between the current position of the autonomous mobile apparatus and the at least two boundaries as relative distances;
determining whether there is at least one avoidance distance; the avoidance distance is the relative distance being greater than the passage clearance;
when there is at least one avoidance distance, setting a target boundary based on the avoidance distance; and
controlling the autonomous mobile apparatus to execute an avoidance operation for moving along a specified direction and staying at the target boundary;
wherein the step of setting the target boundary based on the avoidance distance comprises:
determining whether there are more than one avoidance distances;
when there are more than one avoidance distances, setting a reference line;
acquiring angles between the reference line and the avoidance distances; and
selecting the boundary corresponding to the avoidance distance with a positive angle as the target boundary;
wherein the reference line is a line perpendicular to a connection line between the autonomous mobile apparatus and the object apparatus; the reference line and the connection line between the autonomous mobile apparatus and the object apparatus serve as axis of coordinates to establish a quadrant, an angle in a first or second quadrant is a positive angle, and the angle in a third or fourth quadrant is a negative angle;
a reference circle is formed based on the object apparatus as a center of the reference, and a diameter of the reference circle is the distance between the autonomous mobile apparatus and the object apparatus; the reference line is tangent to the reference circle at a point of the position of the autonomous mobile apparatus.

2. The method of claim 1, wherein before the step of the computing distances between the current position of the autonomous mobile apparatus and the at least two boundaries as the relative distances, the method further comprises:
acquiring a first travel direction of the autonomous mobile apparatus, and a second travel direction of the object apparatus;
determining whether the first travel direction and the second travel direction are overlapped with each other;
when the first travel direction and the second travel direction are overlapped with each other, acquiring a speed of the autonomous mobile apparatus as a first speed and a speed of the object apparatus as a second speed;
determining whether the second speed is greater than the first speed;
when the second speed is less than or equal to the first speed, controlling the autonomous mobile apparatus to move along the first travel direction; and
when the first travel direction and the second travel direction are not overlapped or when the second speed is greater than the first speed, computing the distances between the current position of the autonomous mobile apparatus and the at least two boundaries as the relative respective distances.

3. The method of claim 1, wherein the step of setting the target boundary based on the avoidance distance comprises:
determining whether a number of the at least one avoidance distance is more than one;
when there are more than one avoidance distances, selecting the boundary corresponding to the minimum avoidance distance as the target boundary.

4. The method of claim 1, wherein the passage clearance is acquired by a camera.

5. The method of claim 2, the method further comprises:
when there is no avoidance distance, controlling the autonomous mobile apparatus to move along the second travel direction of the object apparatus.

6. The method of claim 2, wherein the method further comprises:
when receiving a deactivation instruction, controlling the autonomous mobile apparatus to deactivate the avoidance operation and to move along the first travel direction of the object apparatus.

7. The method of claim 1, wherein the autonomous mobile apparatus further broadcasts broadcast the avoidance instruction to other autonomous mobile apparatuses in a specified range.

8. An autonomous mobile apparatus communicates with an object apparatus; the autonomous mobile apparatus comprises a processor and a storage; the processor executes program codes stored in the storage; the storage comprises:
a receiving module, configured to receive an avoidance instruction from the object apparatus;
an acquiring module, configured to acquire a passage clearance of the object apparatus and at least two boundaries in current position of the autonomous mobile apparatus;
a computing module, configured to compute distances between the current position of the autonomous mobile apparatus and the at least two boundaries as relative distances;
a determining module, configured to determine whether there is at least one avoidance distance; the avoidance distance is the relative distance being greater than the passage clearance;
a setting module, configured to set a target boundary based on the avoidance distance when there is at least one avoidance distance; and
a controlling module, configured to control the autonomous mobile apparatus to execute an avoidance operation for moving along a specified direction and staying at the target boundary;
the determining module further configured to determine whether there are more than one avoidance distances;
when there are more than one avoidance distances, the setting module further configured to set a reference line;

the acquiring module further configured to acquire angles between the reference line and the avoidance distances; and the setting module further configured to select the boundary corresponding to the avoidance distance with a positive angle as the target boundary;

wherein the reference line is a line perpendicular to a connection line between the autonomous mobile apparatus and the object apparatus; the reference line and the connection line between the autonomous mobile apparatus and the object apparatus serve as axis of coordinates to establish a quadrant, an angle in a first or second quadrant is a positive angle, and the angle in a third or fourth quadrant is a negative angle;

a reference circle is formed based on the object apparatus as a center of the reference, and a diameter of the reference circle is the distance between the autonomous mobile apparatus and the object apparatus; the reference line is tangent to the reference circle at a point of the position of the autonomous mobile apparatus.

9. The autonomous mobile apparatus of claim 8, wherein the acquiring module further acquires a first travel direction of the autonomous mobile apparatus and a second travel direction of the object apparatus; the determining module further determines whether the first travel direction and the second travel direction are overlapped with each other; when the first travel direction and the second travel direction are overlapped with each other, the acquiring module further acquires a speed of the autonomous mobile apparatus as a first speed and a speed of the object apparatus as a second speed; the determining module further determines whether the second speed is greater than the first speed; when the second speed is less than or equal to the first speed, the controlling module further controls the autonomous mobile apparatus to move along the first travel direction; when the first travel direction and the second travel direction are not overlapped or when the second speed is greater than the first speed, the computing module computes the distances between the current position of the autonomous mobile apparatus and the at least two boundaries as the relative respective distances.

10. The autonomous mobile apparatus of claim 8, wherein the determining module further determines whether there are more than one avoidance distances; when there are more than one avoidance distances, the setting module selects the boundary corresponding to the minimum avoidance distance as the target boundary.

11. The autonomous mobile apparatus of claim 8, wherein the passage clearance is acquired by a camera.

12. The autonomous mobile apparatus of claim 9, wherein when there is no avoidance distance, the controlling module controls the autonomous mobile apparatus to move along the second travel direction of the object apparatus.

13. The autonomous mobile apparatus of claim 9, wherein when receiving a deactivation instruction, the controlling controls the autonomous mobile apparatus to deactivate the avoidance operation and to move along the first travel direction of the object apparatus.

14. The autonomous mobile apparatus of claim 8, wherein the autonomous mobile apparatus further broadcasts broadcast the avoidance instruction to other autonomous mobile apparatuses in a specified range.

* * * * *